(12) United States Patent
Tsuchiya (10) Patent No.: US 11,515,811 B2
(45) Date of Patent: Nov. 29, 2022

(54) VIBRATION-TYPE ACTUATOR, PAN HEAD, AND ELECTRONIC APPARATUS

(71) Applicant: CANON KABUSHIKI KAISHA, Tokyo (JP)

(72) Inventor: Satoshi Tsuchiya, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 134 days.

(21) Appl. No.: 17/162,711

(22) Filed: Jan. 29, 2021

(65) Prior Publication Data

US 2021/0242808 A1  Aug. 5, 2021

(30) Foreign Application Priority Data

Feb. 3, 2020  (JP) .............................. JP2020-016620
Dec. 11, 2020  (JP) .............................. JP2020-205600

(51) Int. Cl.
*H02N 2/10* (2006.01)
*H02N 2/00* (2006.01)
*G03B 17/56* (2021.01)

(52) U.S. Cl.
CPC ........... *H02N 2/103* (2013.01); *H02N 2/0065* (2013.01); *G03B 17/561* (2013.01)

(58) Field of Classification Search
CPC ...... H02N 2/103; H02N 2/0065; H02N 2/163; G03B 17/561; G03B 3/10; G03B 2205/0061
See application file for complete search history.

(56) References Cited

U.S. PATENT DOCUMENTS

2011/0273058 A1* 11/2011 Suefuji ................ H02N 2/0065
                                                 310/323.02
2012/0146460 A1*  6/2012 Suefuji .................. H02N 2/163
                                                 310/323.08

FOREIGN PATENT DOCUMENTS

JP          2017108615 A     6/2017

* cited by examiner

*Primary Examiner* — Emily P Pham
(74) *Attorney, Agent, or Firm* — Canon U.S.A., Inc. I.P. Division (57) ABSTRACT

A vibration-type actuator includes a vibrating body including an annular elastic member and an electric-mechanical energy conversion element, and an annular contact body configured to move relative to the vibrating body. The contact body includes a base portion, a support portion annularly extending from the base portion in a radial direction of the contact body, and a friction member provided at the support portion, formed separately from the support portion, and being in contact with the vibrating body. The friction member includes a first part extending in a direction along a central axis of the annular contact body, and a second part extending in the radial direction, the first part and the second part being connected to the support portion. The first part includes a portion that is connected by being either internally or externally fitted to the support portion in the radial direction.

8 Claims, 11 Drawing Sheets

VIBRATION-TYPE ACTUATOR, PAN HEAD, AND ELECTRONIC APPARATUS

BACKGROUND OF THE INVENTION

Field of the Invention

The present invention relates to a vibration-type actuator including a vibrating body and a contact body.

Description of the Related Art

Thanks to characteristics such as low speed and large torque, a vibration-type actuator has been put to practical use as, for example, an autofocus driving motor in a taking lens of a single-lens reflex camera, and has also been expected to be applied to various electronic apparatuses other than cameras in recent years. For example, the vibration-type actuator is expected to be applied to the joint driving mechanism of a robot arm, the rotation driving mechanism of a robot hand, the rotation driving mechanism of a pan head for an imaging apparatus such as a monitoring camera, and the rotation driving mechanism of a photosensitive drum of an image forming apparatus.

To provide the vibration-type actuator applicable for other uses as described above, Japanese Patent No. 5631018 discusses a technique that uses stamping of sheet material in manufacturing a contact spring of a movable body (contact body), in response to demands such as improved productivity and lower cost of the vibration-type actuator. In this technique, the contact spring is manufactured separately from the main body of the movable body, and the contact spring and the main body are bonded to each other later.

However, in the technique illustrated in, for example, FIG. 6 of Japanese Patent No. 5631018, the contact spring can be distorted by stamping or heat treatment such as quenching, which can cause a misalignment or a nonuniform adhesive layer thickness when the contact spring is bonded to the main body of the movable body, resulting in nonuniform rigidity of the contact spring. Thus, there is an issue where an abnormal noise (squeal) occurs in the vibration-type actuator, with respect to the standard that requires lower sound pressure levels in response to recent demands for a higher level of quietness. In addition, in terms of a higher durability standard, there is an issue where adhesive peeling occurs because of the spring-back of the contact spring.

Moreover, in the technique illustrated in FIGS. 7B and 7C of Japanese Patent No. 5631018, a contact member (friction member) can be distorted by stamping or heat treatment such as quenching, and thus a misalignment can occur when the contact member is bonded to the main body, or an abnormal noise (squeal) can occur in the vibration-type actuator.

SUMMARY OF THE INVENTION

The present invention is directed to a vibration-type actuator that suppresses generation of an abnormal noise and peeling of an adhesive portion of a contact body.

According to an aspect of the present invention, a vibration-type actuator includes a vibrating body including an annular elastic member and an electric-mechanical energy conversion element, and an annular contact body configured to move relative to the vibrating body. The contact body includes a base portion, a support portion annularly extending from the base portion in a radial direction of the contact body, and a friction member provided at the support portion, formed separately from the support portion, and being in contact with the vibrating body. The friction member includes a first part extending in a direction along a central axis of the annular contact body, and a second part extending in the radial direction, the first part and the second part being connected to the support portion. The first part includes a portion that is connected by being either internally or externally fitted to the support portion in the radial direction.

A vibration-type actuator that suppresses generation of an abnormal noise and peeling of an adhesive portion of a contact body can be thereby provided.

Further features of the present invention will become apparent from the following description of exemplary embodiments with reference to the attached drawings.

DESCRIPTION OF THE EMBODIMENTS

Exemplary embodiments of the present invention will be described in detail below with reference to the attached drawings.

Figure 1:
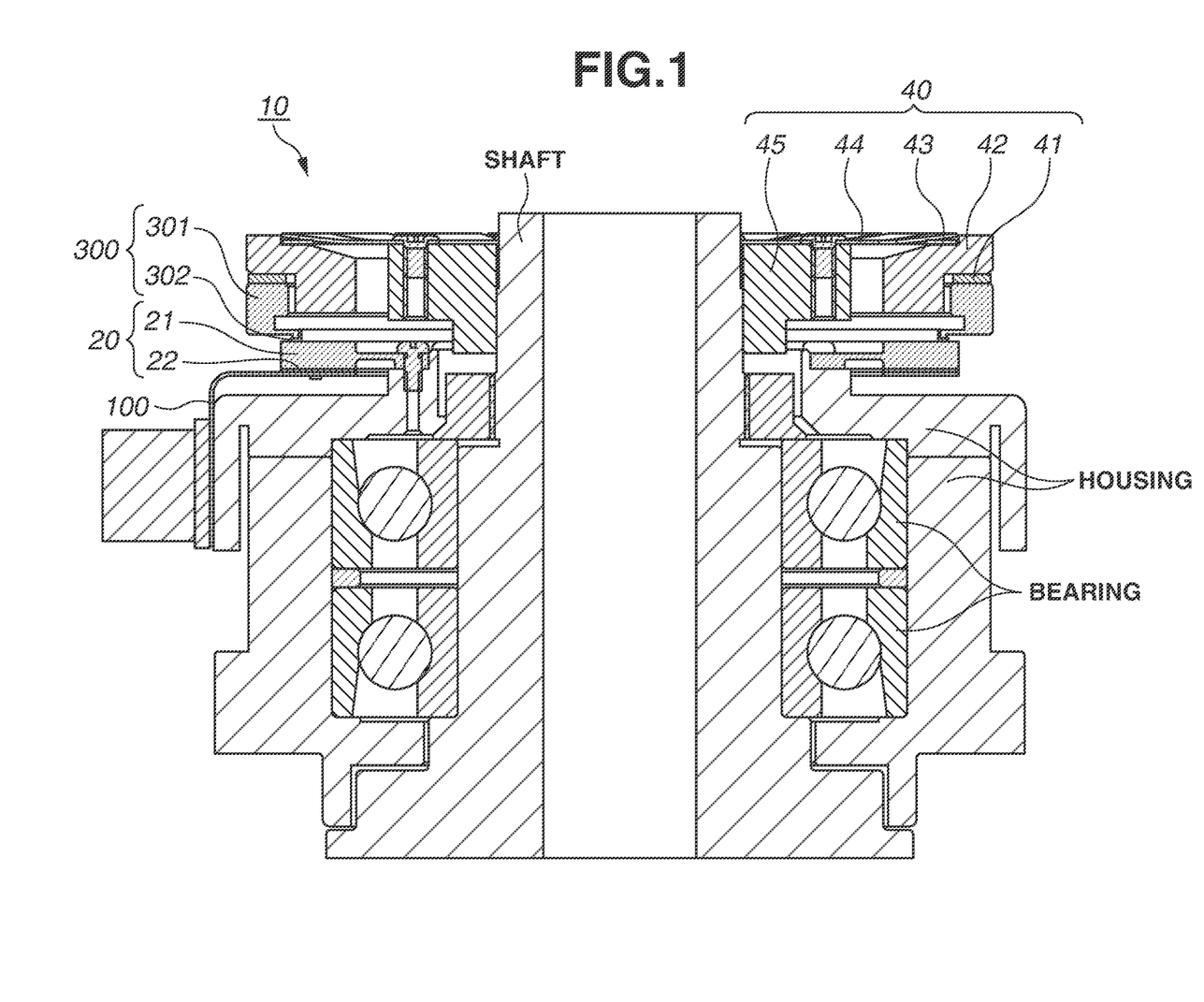
FIG. 1 is a cross-sectional view schematically illustrating a configuration of a vibration-type actuator according to a first exemplary embodiment of the present invention.

FIG. 1 is a cross-sectional view schematically illustrating a configuration of a vibration-type actuator 10 according to a first exemplary embodiment of the present invention. A mechanical configuration of the vibration-type actuator 10, including a vibrating body 20, a contact body 300 (movable body or driven body), and a pressing mechanism 40 is functionally equivalent to, for example, that of a vibration-type actuator discussed in Japanese Patent Application Laid-Open No. 2017-108615.

The vibration-type actuator 10 according to the present exemplary embodiment includes the vibrating body 20 including an elastic member 21 and a piezoelectric element (electric-mechanical energy conversion element) 22, and the contact body 300 being in contact with the vibrating body 20. The vibration-type actuator 10 further includes a power supply member (flexible printed circuit board) 100 that supplies power to the piezoelectric element (electric-mechanical energy conversion element) 22.

In FIG. 1, the vibration-type actuator 10 includes the vibrating body 20 having an annular shape, the contact body 300 having an annular shape, and the pressing mechanism 40. The vibration-type actuator 10 further includes a shaft, a housing, and a bearing.

The vibrating body 20 includes the elastic member 21, the piezoelectric element 22 serving as the electric-mechanical energy conversion element, the power supply member 100 joined to the piezoelectric element 22 to apply a drive voltage, which is an alternating current (AC) voltage, to the piezoelectric element 22.

The pressing mechanism 40 includes a vibration isolating rubber 41, a pressure spring bearing member 42, a pressure spring bearing rubber 43, a pressure spring 44, and a pressure spring fixing member 45. The vibrating body 20 and the contact body 300 are concentrically arranged using the shaft as a central axis, and are in pressure-contact (frictional contact) with each other in a thrust direction of the shaft by the pressing mechanism 40 fixed to the shaft. More specifically, the pressure spring 44 of which movement is regulated by the pressure spring fixing member 45 fixed to the shaft presses the contact body 300 in the thrust direction via the vibration isolating rubber 41, the pressure spring bearing member 42, and the pressure spring bearing rubber 43. This configuration enables the contact body 300 and the vibrating body 20 to be stably in contact with each other.

In the vibration-type actuator 10, a drive voltage, which is an AC voltage, is applied to the piezoelectric element 22 via the power supply member 100, so that the vibrating body 20 excites a driving vibration. The state of the driving vibration depends on the number and the arrangement form of a plurality of electrodes included in the piezoelectric element 22. The piezoelectric element 22 is designed so that the excited driving vibration is an nth-order (n=9 in the present exemplary embodiment) traveling wave that travels in the circumferential direction of the vibrating body 20. The nth-order driving vibration is a bending vibration in which the number of waves in the circumferential direction of the vibrating body 20 is "n". The driving vibration generated in the piezoelectric element 22, more specifically, the traveling wave generated in a contact portion 25 (see FIG. 2) of the vibrating body 20 drives the contact body 300 in the circumferential direction of the shaft. In other words, the contact body 300 rotates relative to the vibrating body 20 while remaining concentric with the vibrating body 20. A rotation force generated in the contact body 300 is output to the outside via the pressing mechanism 40 and the shaft.

The vibration-type actuator 10 according to the present exemplary embodiment illustrated in FIG. 1 can freely rotate a movable object such as a camera, for example, when the housing is fixed to a desired member and the movable object is fixed to a flange surface formed in a spreading shape at a lower part of the shaft. Alternatively, the shaft may be fixed so that the housing can be rotated.

Figure 2:
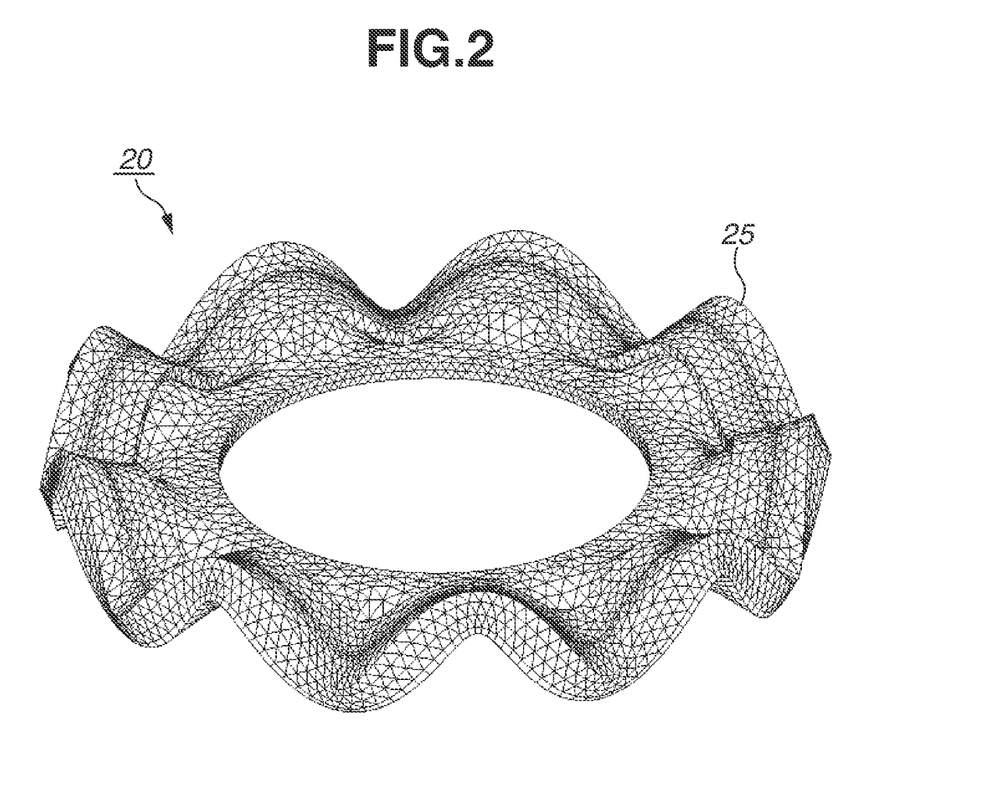
FIG. 2 is a diagram illustrating a mode of deformation of a driving vibration excited by a vibrating body according to the first exemplary embodiment.

FIG. 2 is a diagram illustrating a mode of deformation of the driving vibration excited in the vibrating body 20. In FIG. 2, displacement of the driving vibration excited in the vibrating body 20 is exaggerated for easy understanding of the displacement.

Figure 3A:
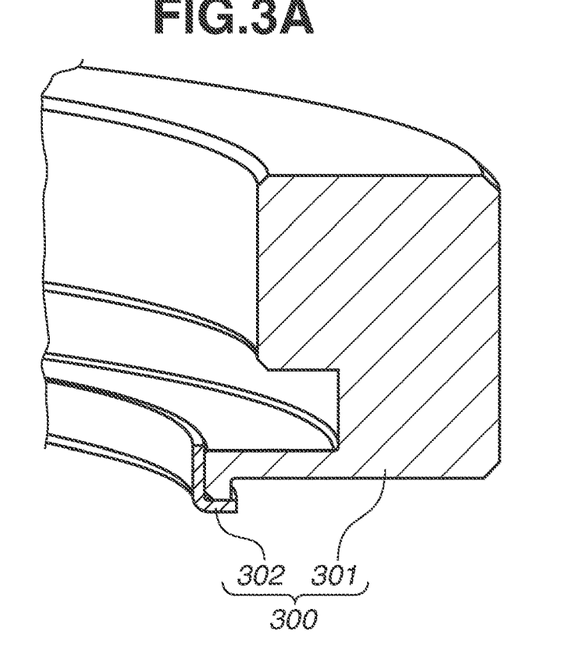
FIGS. 3A and 3B are diagrams schematically illustrating a configuration of a contact body according to the first exemplary embodiment.

FIG. 3A is a cross-sectional perspective view schematically illustrating a configuration of the contact body 300. The contact body 300 includes a main body member 301 and a friction member 302 that is formed separately from the main body member 301. The main body member 301 and the friction member 302 are fitted to each other and connected by adhesion or joining.

Figure 3B:
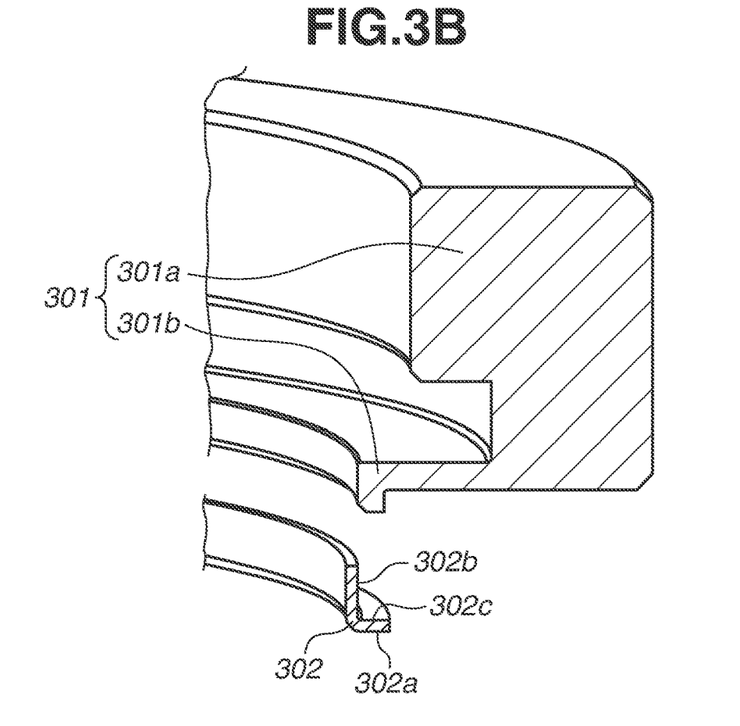

FIG. 3B is a cross-sectional perspective view schematically illustrating a state where the main body member 301 and the friction member 302 are separated from each other.

The main body member 301 includes a base portion 301a, and a support portion 301b annularly extending in a radial direction of the contact body 300. The support portion 301b has an L-shaped cross-section, and an end to which the friction member 302 is connected. The main body member 301 is annular.

The friction member 302 has an L-shaped cross-section and is annular. The friction member 302 includes a first part 302b extending in a direction along a central axis of the contact body 300, a second part 302c extending in the radial direction of the contact body 300, and a friction surface 302a to be brought into contact with the vibrating body 20.

The first part 302b is connected to the support portion 301b by being internally fitted thereto (i.e., by being fitted to the inner-diameter side of the support portion 301b). The second part 302c is connected to the end of the support portion 301b. The contact body 300 is to be brought into contact with the vibrating body 20 at the friction surface 302a, and the support portion 301b serves as a contact spring. Variation of the rigidity of the contact spring causes an abnormal noise (squeal) in the vibration-type actuator 10. Thus, it is desirable that the support portion 301b serving as the contact spring be formed of a material with a low Young's modulus such as an aluminum alloy or brass so that the variation of the spring rigidity does not occur even if there is a machining error. On the other hand, it is desirable that the friction member 302 be formed of a material with high abrasion resistance such as steel because the friction member 302 is in frictional contact with the vibrating body 20. In general, a material with high abrasion resistance such as steel is rigid and has a high Young's modulus as compared with a material such as an aluminum alloy or brass. In other words, it is desirable that the Young's modulus of the material of the support portion 301b be lower than the Young's modulus of the material of the friction member 302.

Furthermore, the base portion 301a is brought into contact with the vibration isolating rubber 41 so that generation of an abnormal noise in the vibration-type actuator 10 is suppressed by a damping effect.

An effect of the L-shaped cross-section of the friction member 302 will be described. If the cross-section of the friction member 302 is L-shaped, the lengths of the first part 302b and the second part 302c forming the L shape can be freely designed. Designing the first part 302b to be long can increase the fitting length of the friction member 302 and the support portion 301b, so that the friction member 302 and the support portion 301b can surely be fitted to each other even if distortion of the friction member 302 is large, thereby improving assemblability. Moreover, in a case where the two components are bonded or joined together, the bonding area increases, so that the bonding strength can be enhanced. Furthermore, designing the second part 302c to be long can increase the area of the friction surface 302a to be brought into contact with the vibrating body 20, so that an abrasion loss can be reduced.

It is desirable that the first part 302b and the second part 302c of the friction member 302 be not only long but also lightweight. If the cross-section of the friction member 302 is L-shaped, the weight of the friction member 302 can be reduced, as compared with a friction member having a rectangular cross-section. If the friction member 302 is lightweight, it is possible to increase the natural frequency of a vibration mode in which deformation occurs in the support portion 301b on which the friction member 302 acts as a mass. Accordingly, the friction surface 302a is smoothly in contact with the vibrating body 20 to improve sliding efficiency, so that issues of a vibration-type actuator such as abrasion and squeal can be suppressed. In addition, if the cross-section of the friction member 302 is L-shaped, the friction member 302 can be easily manufactured by bending (stamping) of strip steel. The parallelism of the strip steel in the sheet thickness direction is highly precise, so that the flatness of the friction surface 302a can be improved by abutting the second part 302c against the support portion 301b to follow the support portion 301b. This can suppress generation of squeal in the vibration-type actuator 10 and stabilize the driving performance.

The material of each of the main body member 301 and the friction member 302 and a method for manufacturing each of these members will be described. It is desirable that the friction member 302 be formed of a material with high abrasion resistance, and the friction member 302 can be manufactured by stamping and quenching, using a plate of steel material such as stainless steel. In contrast, the main body member 301 is required to have a vibration damping function, and thus is formed of a material with a high damping ability. Furthermore, it is desirable that the material of the main body member 301 be a free-cutting material that can be processed with high accuracy, and the main body member 301 can be manufactured by cutting a material, such as an aluminum alloy or brass, having a higher free-cutting property than the material of the friction member 302. The main body member 301 may be subjected to surface treatment, or may be subjected to alumite treatment if an aluminum alloy is used as the material. The method for manufacturing each of the friction member 302 and the main body member 301 is not limited to the above-described example. Possible examples of the method for manufacturing the friction member 302 include laser beam machining, electric discharge machining, cutting, etching, and any combination thereof. Furthermore, the heat treatment of the friction member 302 may be nitriding or carburizing, or hardening treatment such as plating other than the heat treatment may be employed. Possible examples of the method for manufacturing the main body member 301 include die-casting, forging, and any combination thereof.

The assembly of the main body member 301 and the friction member 302 will be described. The main body member 301 has high stiffness as a component, and thus can be manufactured with higher accuracy than the friction member 302. On the other hand, large distortion occurs in the friction member 302 during the manufacturing process including stamping and quenching.

The friction member 302 has low stiffness as a component, and thus can be elastically deformed with ease. Therefore, the friction member 302 is fitted while being elastically deformed with respect to the main body member 301 manufactured with high accuracy, so that bonding misalignment of the friction member 302 can be reduced and the roundness of the friction surface 302a can be improved. Furthermore, it is desirable that the main body member 301 and the friction member 302 be connected by adhesion or joining to avoid a metal-to-metal friction. This can suppress generation of an abnormal noise (squeal) in the vibration-type actuator 10.

In the present exemplary embodiment and the following modification examples, the first part includes a portion that is connected to the main body member by being either internally or externally fitted thereto in the radial direction of the contact body, and is designed to relax excessive restraint. Thus, peeling or abnormal noise is further suppressed.

Figure 4:
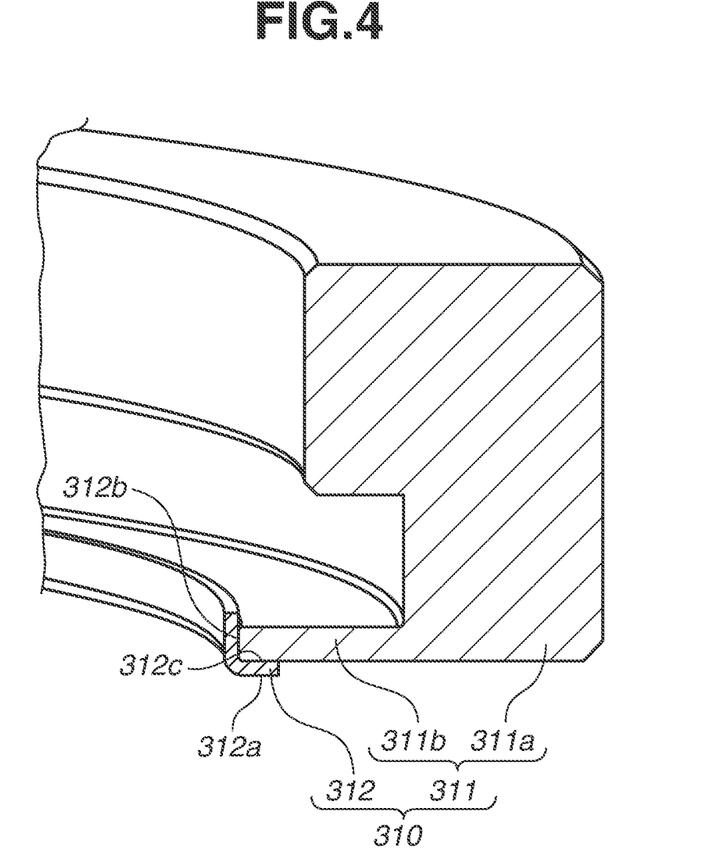
FIG. 4 is a diagram schematically illustrating a configuration of a contact body according to a first modification example of the first exemplary embodiment.

FIG. 4 is a diagram illustrating one of the modification examples of the present exemplary embodiment. A contact body 310 includes a main body member 311 and a friction member 312 that is formed separately from the main body member 311. The main body member 311 includes a base portion 311a and a support portion 311b, and is annular. The friction member 312 has an L-shaped cross-section, includes a friction surface 312a being in contact with the vibrating body 20, a first part 312b extending in a direction along a central axis of the annular contact body 310, and a second part 312c extending in a radial direction of the contact body 310, and is annular. The first part 312b is connected to an end of the support portion 311b by being internally fitted thereto. In the configuration according to the present modification example, an effect similar to that of the present exemplary embodiment can also be obtained. In addition, in the present modification example, because the cross-section of the support portion 311b is rectangular and thus the shape of the main body member 311 is simplified, so that low cost can be achieved.

Figure 5:
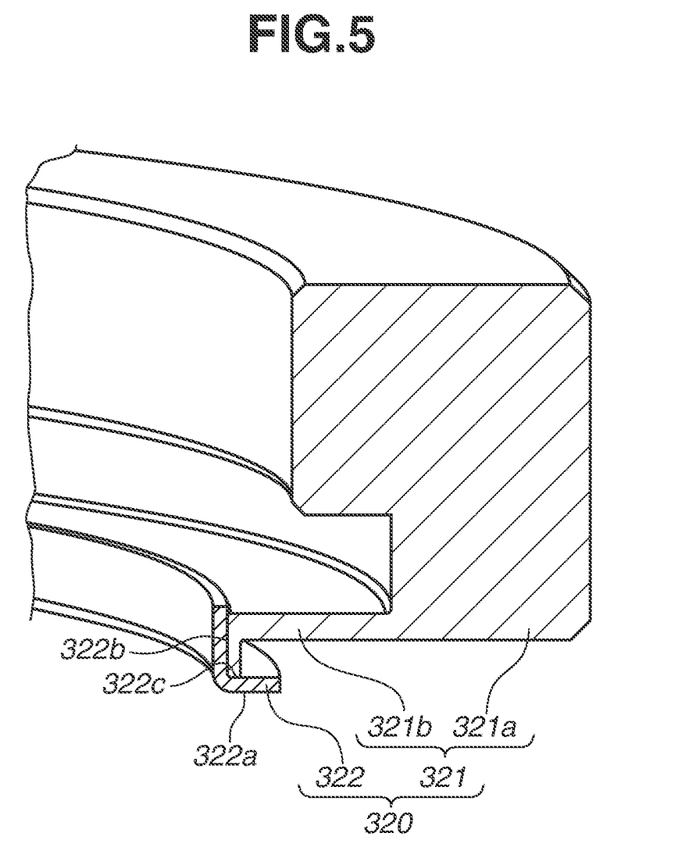
FIG. 5 is a diagram schematically illustrating a configuration of a contact body according to a second modification example of the first exemplary embodiment.

FIG. 5 is a diagram illustrating another one of the modification examples of the present exemplary embodiment. A contact body 320 includes a main body member 321 and a friction member 322 that is formed separately from the main body member 321. The main body member 321 includes a base portion 321a and a support portion 321b, and is annular. The friction member 322 has an L-shaped cross-section, includes a friction surface 322a being in contact with the vibrating body 20, a first part 322b extending in a direction along a central axis of the contact body 320, and a second part 322c extending in a radial direction of the contact body 320, and is annular. The first part 322b is connected to an end of the support portion 321b by being internally fitted thereto. In the configuration according to the present modification example, an effect similar to that of the present exemplary embodiment can also be obtained. In addition, in the present modification example, the area of the friction surface 322a can be increased and the contact pressure between the contact body 320 and the vibrating body 20 can thus be lowered, so that the abrasion of the friction surface 322a can be reduced.

Figure 6:
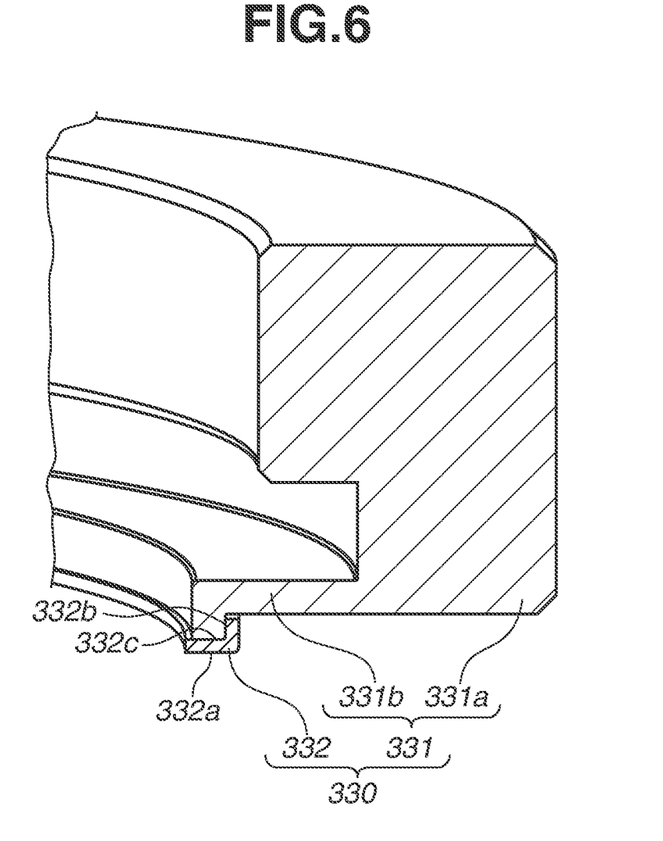
FIG. 6 is a diagram schematically illustrating a configuration of a contact body according to a third modification example of the first exemplary embodiment.

FIG. 6 is a diagram illustrating yet another one of the modifications examples of the present exemplary embodiment. A contact body 330 includes a main body member 331 and a friction member 332 that is formed separately from the main body member 331. The main body member 331 includes a base portion 331a and a support portion 331b, and is annular. The friction member 332 has an L-shaped cross-section, includes a friction surface 332a being in contact with the vibrating body 20, a first part 332b extending in a direction along a central axis of the contact body 330, and a second part 332c extending in a radial direction of the contact body 330, and is annular. The first part 332b is connected to a protrusion at an end of the support portion 331b by being externally fitted thereto (i.e., by being fitted to the outer-diameter side of the support portion 331b). In the configuration according to the present modification example, an effect similar to that of the present exemplary embodiment can also be obtained.

Figure 7:
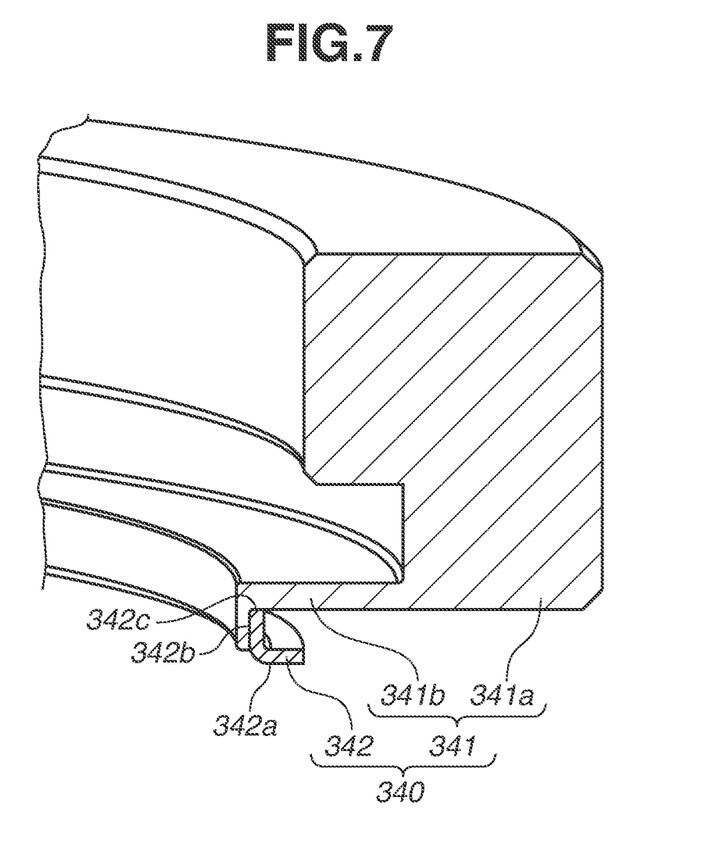
FIG. 7 is a diagram schematically illustrating a configuration of a contact body according to a fourth modification example of the first exemplary embodiment.

FIG. 7 is a diagram illustrating yet another one of the modification examples of the present exemplary embodiment. A contact body 340 includes a main body member 341 and a friction member 342 that is formed separately from the main body member 341. The main body member 341 includes a base portion 341a and a support portion 341b, and is annular. The friction member 342 has an L-shaped cross-section, includes a friction surface 342a being in contact with the vibrating body 20, a first part 342b extending in a direction along a central axis of the contact body 340, and a second part 342c extending in a radial direction of the contact body 340, and is annular. The first part 342b is connected to a protrusion at an end of the support portion 341b by being externally fitted thereto (i.e., by being fitted to the outer-diameter side of the support portion 341b). In the configuration according to the present modification example, an effect similar to that of the present exemplary embodiment can also be obtained. In addition, in the present modification example, the area of the friction surface 342a can be increased, and the contact pressure between the contact body 340 and the vibrating body 20 can thus be lowered, so that the abrasion of the friction surface 342a can be reduced.

Figure 8A:
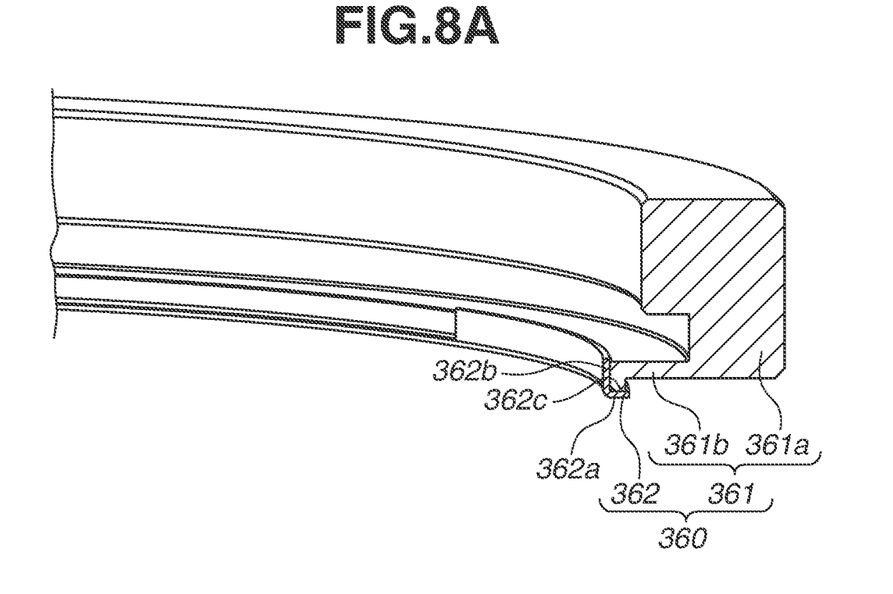
FIGS. 8A and 8B are diagrams schematically illustrating a configuration of a contact body according to a fifth modification example of the first exemplary embodiment.
Figure 8B:
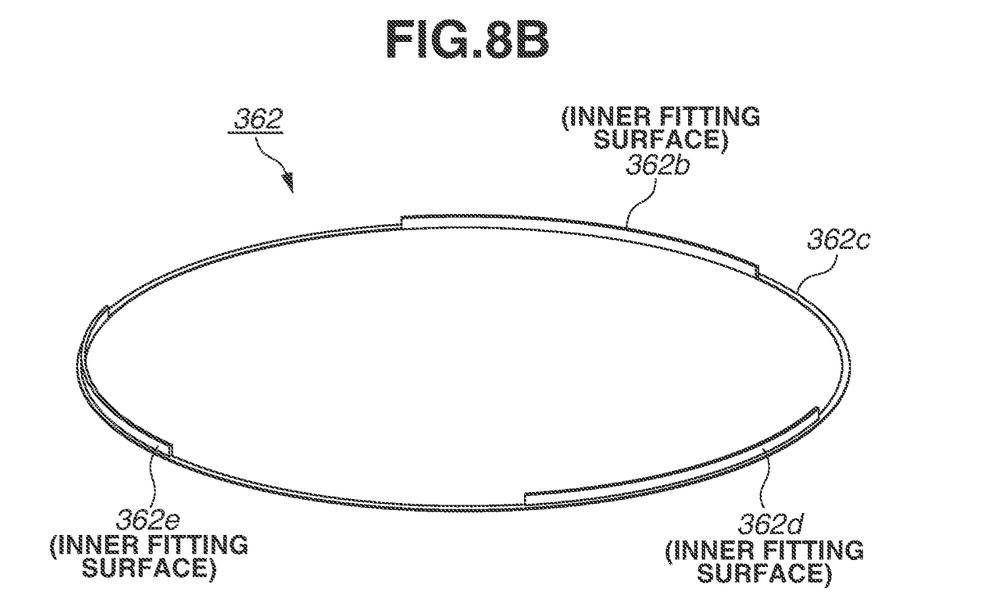

FIG. 8A is a diagram illustrating yet another one of the modification examples of the present exemplary embodiment. FIG. 8B is a diagram illustrating a friction member 362 according to the present modification example. A contact body 360 includes a main body member 361 and the friction member 362 that is formed separately from the main body member 361. The main body member 361 includes a base portion 361a and a support portion 361b, and is annular. The friction member 362 includes a friction surface 362a being in contact with the vibrating body 20, three first parts 362b, 362d, and 362e extending in a direction along a central axis of the contact body 360, and a second part 362c extending in a radial direction of the contact body 360, and is annular. The first part is divided into three in the circumferential direction. The three first parts 362b, 362d, and 362e are connected to an end of the support portion 361b by being internally fitted thereto. In the configuration according to the present modification, an effect similar to that of the present exemplary embodiment can also be obtained. In addition, in the configuration according to the present modification example, bending is easy in a case where the friction member 362 is manufactured by stamping, because the first part is divided. The number of divisions of the first part is not limited to three.

Figures 9A, 9B:
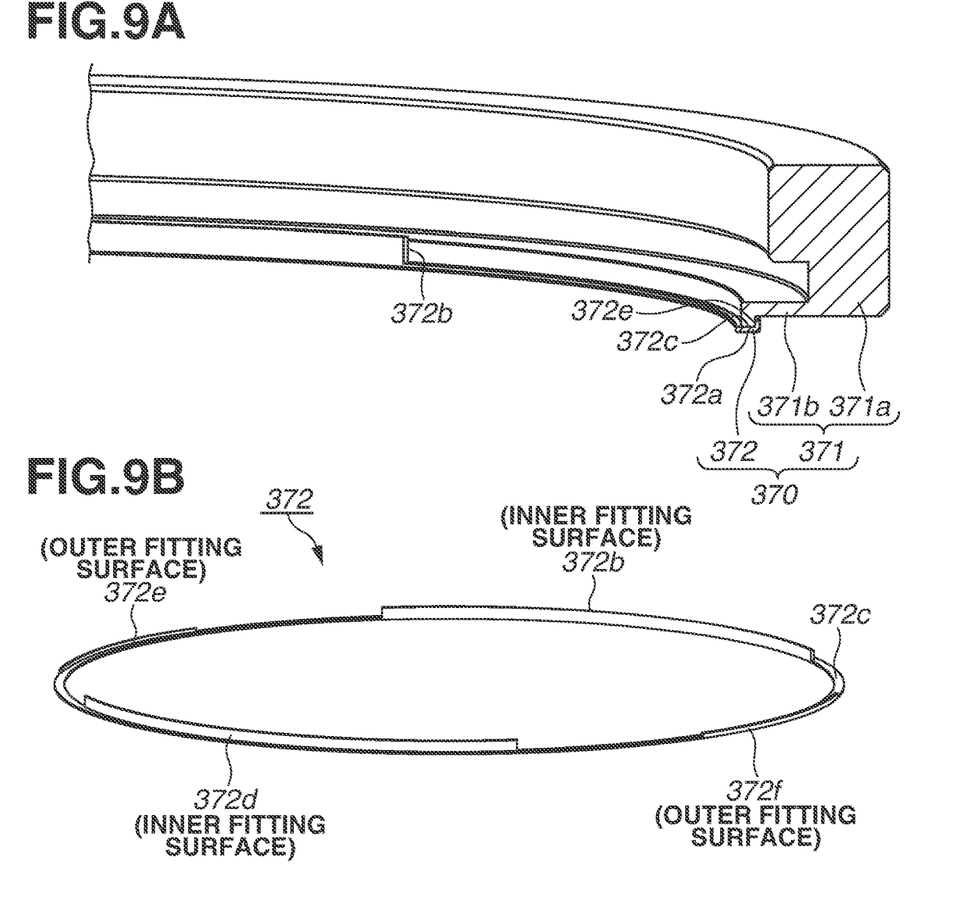
FIGS. 9A to 9C are diagrams schematically illustrating a configuration of a contact body according to a sixth modification example of the first exemplary embodiment.
Figure 9C:
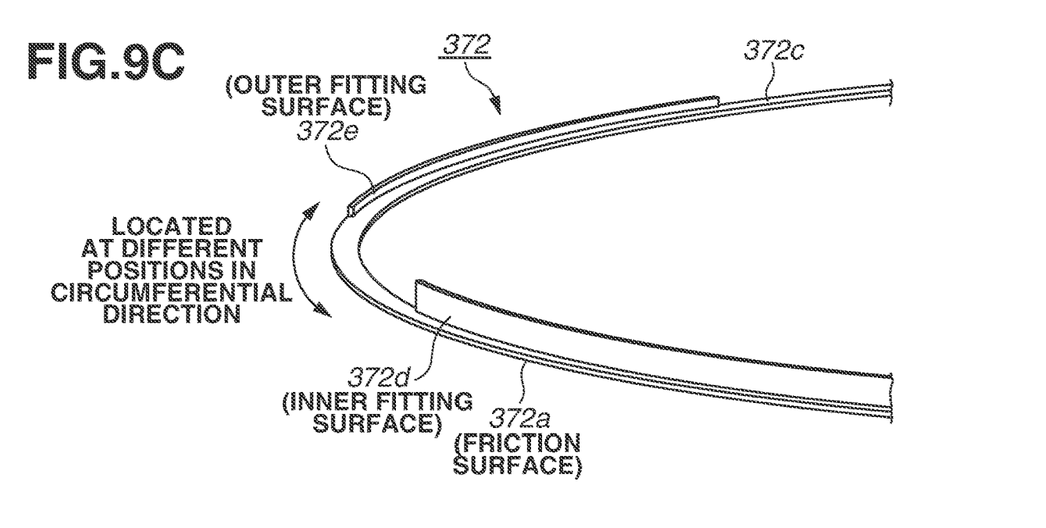

FIG. 9A is a diagram illustrating yet another one of the modification examples of the present exemplary embodiment. FIG. 9B and FIG. 9C are diagrams illustrating a friction member 372 according to the present modification example. A contact body 370 includes a main body member 371 and the friction member 372 that is formed separately from the main body member 371. The main body member 371 includes a base portion 371a and a support portion 371b, and is annular. The friction member 372 includes a friction surface 372a being in contact with the vibrating body 20, four first parts 372b, 372d, 372e, and 372f extending in a direction along a central axis of the contact body 370, and a second part 372c extending in a radial direction of the contact body 370. Among the four first parts 372b, 372d, 372e, and 372f, the two first parts 372b and 372d on the inner-diameter side of the friction surface 372a are connected to the support portion 371b by being internally fitted thereto. Meanwhile, the two first parts 372e and 372f on the outer-diameter side of the friction surface 372a are connected to a protrusion at an end of the support portion 371b by being externally fitted thereto. If the first part is fitted so as to hold the support portion 371b between the first part 372b or 372d on the inner-diameter side and the first part 372e or 372f on the outer-diameter side at the same position in the circumferential direction, assembly is difficult or assembly accuracy decreases because of excessive restraint. Thus, the first part is divided in the circumferential direction, and the friction member 372 is connected to the main body member 371 by being either internally or externally fitted thereto in the radial direction of the contact body 370. In the configuration according to the present modification example, an effect similar to that of the present exemplary embodiment can also be obtained. In addition, in the configuration according to the present modification example, bending is easy in a case where the friction member 372 is manufactured by stamping, because the first part is divided. The number of divisions of the first part is not limited to four.

Figure 10A:
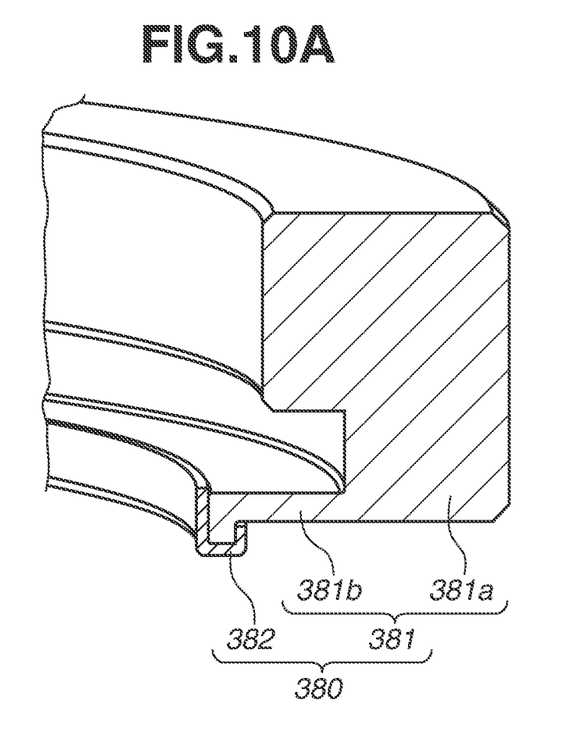
FIGS. 10A and 10B are diagrams schematically illustrating a configuration of a contact body according to a seventh modification example of the first exemplary embodiment.
Figure 10B:
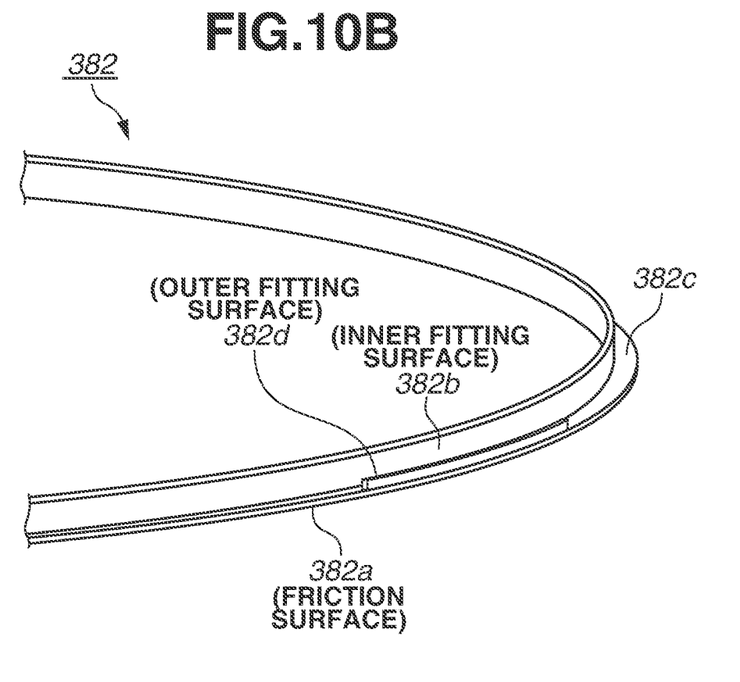

FIG. 10A is a diagram illustrating yet another one of the modification examples of the present exemplary embodiment. FIG. 10B is a diagram illustrating a part of a friction member 382 according to the present modification example. A contact body 380 includes a main body member 381 and the friction member 382 that is formed separately from the main body member 381. The main body member 381 includes a base portion 381a and a support portion 381b, and is annular. The friction member 382 includes a friction surface 382a being in contact with the vibrating body 20, two first parts 382b and 382d extending in a direction along a central axis of the contact body 380, and a second part 382c extending in a radial direction of the contact body 380, and is annular. If the first part is fitted so as to hold the entire circumference of the support portion 381b between the first part 382b on the inner-diameter side and the first part 382d on the outer-diameter side, assembly is difficult or assembly accuracy decreases because of excessive restraint. Thus, the first part 382b on the inner-diameter side of the friction surface 382a is connected to an end of the support portion 381b by being internally fitted to the entire circumference of the support portion 381b, while the first part 382d on the outer-diameter side is connected to a protrusion at the end of the support portion 381b by being externally fitted to only a part of the circumference. In other words, the friction member 382 includes a part that is connected to the main body member 381 by being either internally or externally fitted thereto in the radial direction of the contact body 380. In the configuration according to the present modification example, an effect similar to that of the present exemplary embodiment can be also obtained. In the present exemplary embodiment, the example in which the support portion extends horizontally from the base portion of the contact body toward the inner-diameter side has been described, but the configuration is not limited thereto. The support portion may extend from the base portion of the contact body toward the outer-diameter side. Furthermore, the support portion may obliquely extend from the base portion of the contact body toward a direction along the inner or outer diameter. In each of these configurations, an effect similar to that of the present exemplary embodiment can also be obtained.

In the present exemplary embodiment, the example in which the friction member is arranged at the end of the support portion of the contact body has been described, but the configuration is not limited thereto. The support portion only needs to serve as the contact spring, and the friction member may be fitted to a part of the support portion other than the end thereof. In such a configuration, an effect similar to that of the present exemplary embodiment can also be obtained.

In the present exemplary embodiment, the example in which the friction member is annular with the entire circumference closed has been described, but the configuration is not limited thereto. The friction member may be partially open, or may have an approximately annular configuration. In each of these configurations, an effect similar to that of the present exemplary embodiment can also be obtained.

The drawings of the present exemplary embodiment each illustrate the example of the configuration in which a machining error or distortion in the manufacturing process is not considered, but the configuration is not limited thereto. The contact body actually manufactured can have a larger inside/outside corner radius than those in the drawings, sags and burrs can occur, or the space between the main body member and the friction member can be nonuniform. Even in each of these configurations, an effect similar to that of the present exemplary embodiment can also be obtained.

In a second exemplary embodiment, a configuration of a pan head for an imaging apparatus such as a monitoring camera will be described as an example of an apparatus including the vibration-type actuator 10 described in the first exemplary embodiment.

In the present exemplary embodiment, the pan head including a turntable and a vibration-type actuator provided on the turntable will be described.

Figure 11:
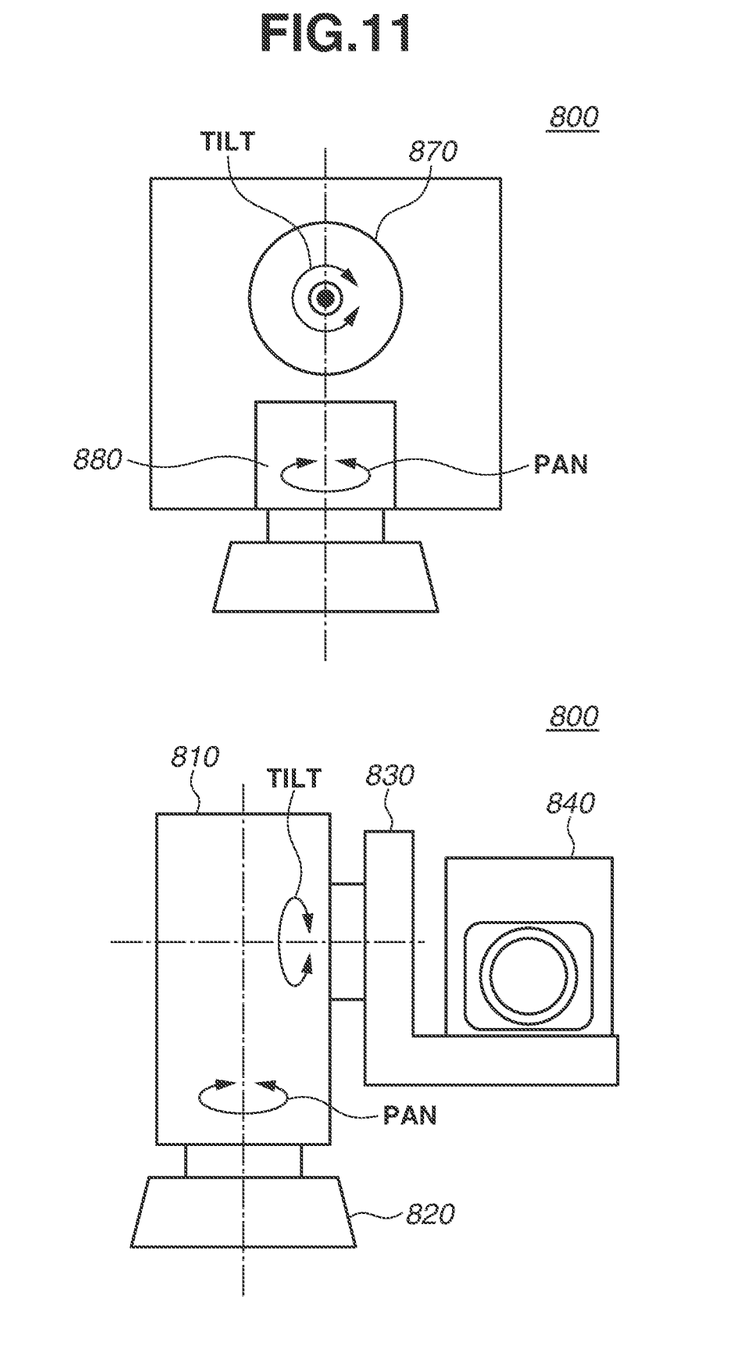
FIG. 11 is a diagram schematically illustrating a configuration of a pan head on which a vibration-type actuator is mounted and a configuration of an imaging apparatus mounted on the pan head, according to a second exemplary embodiment of the present invention.

FIG. 11 is a diagram schematically illustrating a configuration of each of a pan head 800 and an imaging apparatus 840 mounted on the pan head 800. The pan head 800 includes a base 820, a head 810 including two vibration-type actuators 870 and 880, and an L-angle 830 for fixing the imaging apparatus 840. The vibration-type actuator 880 provided along a pan axis rotates the head 810, the L-angle 830, and the imaging apparatus 840 around the pan axis, relative to the base 820. Furthermore, the vibration-type actuator 870 provided along a tilt axis rotates the L-angle 830 and the imaging apparatus 840 around the tilt axis, relative to the head 810.

The two vibration-type actuators 870 and 880 are used in the pan head 800, so that the orientation of the imaging apparatus 840 can be changed at a high speed, at a high response speed, silently, and with high accuracy. In addition, the vibration-type actuators 870 and 880 have high holding torque even during no energization, and thus it is possible to maintain the orientation of the imaging apparatus 840 without consuming the power of the vibration-type actuators 870 and 880 even if there is a shift in the center of gravity around the tilt axis of the imaging apparatus 840.

Furthermore, an electronic apparatus that includes a member desired by a user of any of the exemplary embodiments of the present invention, and a vibration-type actuator on the member can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-016620, filed Feb. 3, 2020, and No. 2020-205600, filed Dec. 11, 2020, which are hereby incorporated by reference herein in its entirety.

What is claimed is:

1. A vibration-type actuator comprising:
a vibrating body including an annular elastic member and an electric-mechanical energy conversion element; and
an annular contact body configured to move relative to the vibrating body,
wherein the contact body includes:
a base portion,
a support portion annularly extending from the base portion in a radial direction of the contact body, and
a friction member provided at the support portion, formed separately from the support portion, and being in contact with the vibrating body,
wherein the friction member includes a first part extending in a direction along a central axis of the annular contact body, and a second part extending in the radial direction, the first part and the second part being connected to the support portion, and
wherein the first part includes a portion that is connected by being either internally or externally fitted to the support portion in the radial direction.

2. The vibration-type actuator according to claim 1, wherein the friction member includes the first part having a plurality of parts.

3. The vibration-type actuator according to claim 2, wherein the plurality of parts in the first part includes a part that is internally fitted to the support portion, and a part that is externally fitted to the support portion.

4. The vibration-type actuator according to claim 1, wherein a material of the support portion has a Young's modulus lower than a Young's modulus of a material of the friction member.

5. The vibration-type actuator according to claim 1, wherein rigidity of a material of the support portion is lower than rigidity of a material of the friction member.

6. The vibration-type actuator according to claim 1, wherein a material of the friction member is steel, and a material of the support portion is an aluminum alloy or brass.

7. A pan head comprising:
a turntable; and
the vibration-type actuator according to claim 1, the vibration-type actuator being provided on the turntable.

8. An electronic apparatus comprising:
a member; and
the vibration-type actuator according to claim 1, the vibration-type actuator being provided on the member.

* * * * *